United States Patent [19]

Ono et al.

[11] 4,096,532
[45] Jun. 20, 1978

[54] MAGNETIC TAPE COPYING METHOD AND APPARATUS

[75] Inventors: Mitsuaki Ono; Masahiko Yatsugake; Norio Miyatake, all of Katano; Yukihiro Fukushima, Neyagawa, all of Japan

[73] Assignee: Matsushita Electric Industrial Co., Ltd., Kadoma, Japan

[21] Appl. No.: 676,814

[22] Filed: Apr. 14, 1976

[30] Foreign Application Priority Data

| Apr. 18, 1975 | Japan | 50-47752 |
| Jul. 16, 1975 | Japan | 50-87737 |
| Aug. 9, 1975 | Japan | 50-110246[U] |
| Dec. 1, 1975 | Japan | 50-162507[U] |
| Jan. 20, 1976 | Japan | 51-5301[U] |

[51] Int. Cl.$^2$ .............................................. G11B 5/86
[52] U.S. Cl. ................................................... 360/16
[58] Field of Search ................................... 360/16–17; 219/216

[56] References Cited

U.S. PATENT DOCUMENTS

| 3,364,496 | 1/1968 | Greiner et al. ............ 360/16 |
| 3,947,872 | 3/1976 | Asai .......................... 360/16 |
| 3,971,069 | 7/1976 | Hanai et al. ............... 360/16 |

*Primary Examiner*—John H. Wolff
*Attorney, Agent, or Firm*—Stevens, Davis, Miller & Mosher

[57] ABSTRACT

In magnetic tape copying method and apparatus wherein a slave tape heated to a temperature near the Curie point and a master tape having a signal recorded thereon are put together with their magnetic surfaces in contact with each other and then cooled, an improvement of reheating the slave tape, after the completion of the transfer, under a smaller tension than that applied during the transfer at a temperature lower than the Curie point to prevent the occurence of skew distortion on a reproduced picture due to deformation with the passage of time of the slave tape.

6 Claims, 12 Drawing Figures

MAGNETIC TAPE COPYING METHOD AND APPARATUS

The present invention relates to a magnetic tape copying method and apparatus.

With the spread of VTR for domestic and educational uses, there has been an increasing demand for apparatus capable of copying a large volume of video tapes at low cost and in a short time. In order to meet such demand, a magnetic tape copying apparatus applying the principle of magnetic field transfer has been achieved more or less by a simultaneous winding process. However as the use of magnetic tapes of high coercive force and high output, such as the $CrO_2$ tape, has increased, it has become difficult to provide a satisfactorily copied tape by the conventional transfer method using a magnetic field. Namely, the transfer of the video signal by the magnetic field transfer method involves the problems that the transfer efficiency is poor and that a master tape having substantially higher coercive force than that of the slave tape is required when the signal is to be transferred onto a tape having high coercive force and high output, such as a $CrO_2$ tape. Hence, it is difficult to provide a master tape which meets such requirement.

To overcome the above problems, a thermal transfer method which is fundamentally different from the principle of magnetic field transfer has been investigated. By the thermal transfer method is meant a method wherein a slave tape heated to a temperature near the Curie point and a master tape having a signal recorded thereon are put together with their magnetic surfaces in contact with each other and then cooled, whereby the signal on the master tape is transferred onto the slave tape. The most significant feature of this method lies in the provision of a high output copied tape. The high output characteristic is particularly remarkable in the high frequency signal region, and in the case of the video tape the method can achieve a high quality of reproduced picture which could not be attained by other methods.

Notwithstanding the above advantage, the thermal transfer method involves a serious problem to be resolved; that is, thermal deformation of the slave tape. For effecting the thermal transfer, it is necessary to heat the magnetic layer of the slave tape to at least near the Curie point thereof. However, when a conventional tape which uses polyethylene terephthalate (PET) or the like as a base material or a tape which is somewhat superior in heat resistance characteristic is used as the slave tape, thermal deformation is caused by the heat during the transfer because of the internal residual stress that occurs during the manufacture of the base material. The thermal deformation involves a contractive stress in the direction of tape width and a contractive stress in the longitudinal direction. Also, there is a deformation which instantaneously occurs at the time of thermal transfer and the contraction which proceeds with the time elapsed after the thermal transfer.

As for the deformation in the direction of width, the extent of the deformation can be restricted within a practically allowable range by reducing the tension during the transfer. Alternatively, a wide tape designed to take the deformation amount into consideration may be used.

As for the longitudinal deformation, there are the deformation which occurs instantaneously at the time of thermal transfer and the contraction which proceeds with the heating time, as stated above. The influence on the copy tape by the former contractive deformation that occurs instantaneously at the time of thermal transfer appears as a phenomenon of longitudinal contraction of the record pattern on the slave tape which has been copied from the master tape. In a prior art method to overcome this problem, the longitudinal component of the record pattern on the master tape has been recorded somewhat longer than the normal value so that when the transfer is conducted with such master tape the transferred pattern on the slave tape, which is instantaneously shortened in the longitudinal direction at the time of the transfer, will finally have a normal pattern length after the contractive deformation. On the other hand, the influence by the latter phenomenon of the contraction which proceeds with the heating time primarily appears in a VTR, particularly a helical scan type VTR wherein the video signal is recorded approximately in the longitudinal direction of the tape and it is reproduced by a rotary head. In this case, there is a problem that the image is distorted at the head switching points and the distortion increases with time. This distortion is usually called skew distortion, and in the helical scan type VTR the skew distortion is a serious problem even when the longitudinal deformation is slight such as on the order of 0.03 –0.04%. The line A in FIG. 1a shows the measurement of change in the amount of contraction in the longitudinal direction of the tape, with the time elapsed after the thermal transfer. The measurement illustrated by the line A in FIG. 1a shows that there is no skew distortion on the reproduced image immediately after the thermal transfer, but after the elapse of 1000 hours a skew distortion which is equivalent to 20 $\mu$s in time appears at the head switching point on the reproduced image, which results in an extremely unsightly image. Thus, in the thermal transfer there has been a serious problem of deformation with the passage of time of the copied tape after the copying operation.

Referring to FIG. 2, details of an example of a construction of a thermal transfer apparatus which has been heretofore proposed will be discussed.

In FIG. 2, 21 designates a master tape having a signal recorded thereon, 22 a supply reel for the master tape, 23 a take-up reel. 24 denotes a slave tape having magnetic particles with low Curie point, such as $CrO_2$, coated thereon, 25 and 26 a supply reel and a take-up reel, respectively, for the slave tape. 27 to 30 represent vacuum columns for stabilizing the travel of the tapes and maintaining a constant tape tension, and 31 and 32 guide posts for guiding the tape travel. 33 denotes a heater for heating the slave tape 24 to raise the temperature of the slave tape 24 near the Curie point thereof. The master and slave tapes are driven by a capstan 34 and a pinch roller 35. The tapes have their magnetic surfaces pressed to each other by a presser 36 around an outer periphery of the capstan 34. A front surface of the presser 36, i.e. a surface facing the outer periphery of the capstan 34 is made of a porous member such as a sintered metal, and pressurized air jets are ejected from the pores of the porous member to press the master and slave tapes to each other on the outer of periphery the capstan. The slave tape 24 which has been heated by the heater 33 near the Curie point is now pressed to the master tape 21 by the capstan 34 and the presser 36 and simultaneously cooled thereby, whereupon the signal on the master tape 21 is transferred onto the slave tape 24. In the prior art magnetic tape copying apparatus of the construction shown in FIG. 2, the slave tape 24 having been copied thereon is taken up on the take-up reel 26 for direct use or it is used after having been wound on a container such as a cassette or cartridge. The slave tape prepared by such prior art thermal transfer apparatus, however, exhibits contractive deformation with the passage of time as stated above, resulting in skew distortion, which increases with time, on the reproduced image. Therefore, it has been difficult to use the above slave tape as a copy tape for the helical scan type VTR.

It is an object of the present invention to provide novel means for preventing skew distortion on a reproduced picture due to distortion with age of a slave tape after the thermal transfer.

The foregoing and other objects, features and advantages of the present invention will become apparent from the following description of the preferred embodiments of the invention when taken in conjunction with the accompanying drawings, in which;

FIG. 1a shows the relation between the amount of contraction in the longitudinal direction of a tape and elapsed time, FIG. 1b also shows the relation between the amount of contraction in the longitudinal direction of a tape and elapsed time, FIG. 2 shows a configuration of the prior art thermal transfer apparatus, FIG. 3 shows a characteristic curve illustrating output decrease by heating vs heating temperature for a $CrO_2$ tape, FIG. 4 shows one embodiment of the present invention in which reheating means comprising a constant temperature oven is added to a prior art thermal transfer apparatus.

FIG. 5 shows an embodiment of the reheating means comprising a constant temperature oven with tape defining diaphragms, FIG. 6 shows an embodiment of the present invention using a sector heater as the reheating means, FIG. 7 shows an embodiment of the present invention using a circular heater as the reheating means, FIG. 8 shows an embodiment of the reheating means in which a sliding heater and a constant temperature oven are combined, FIG. 9 shows an embodiment of the reheating means in which a sliding heater is housed in a constant temperature oven.

In the drawings, like reference numerals refer to like parts.

The following conclusions have been drawn from various studies on the skew distortion of the slave tape after thermal transfer.

Experiment I: Using the prior art thermal transfer apparatus as shown in FIG. 2, a slave tape having been thermally transferred thereon was wound on the take-up reel 26 under a tape tension during the thermal transfer, that is under 500 g/mm², and the reel was placed in a constant temperature oven kept at 60° C and left therein for 2 minutes. Then, the tape was taken out of the oven and the deformation with the passage of time in the length of the tape was measured at room temperature. It showed substantially the same characteristic as the line A in FIG. 1a.

Experiment II: Using the prior art thermal transfer apparatus as shown in FIG. 2, a slave tape having been thermally transferred thereon was wound on the take-up reel 26 under substantially zero tension. The slave tape was then heated under exactly the same condition as in Experiment I and then the deformation with passage of time in the length of the tape was measured at room temperature. It showed a characteristic shown by dotted line B in FIG. 1a.

Experiment III: Using the prior art thermal transfer apparatus as shown in FIG. 2 while additionally arranging a second heater between the vacuum column 30 and the tape guide 32, which heater is of substantially the same shape as the heater 33 shown in FIG. 2 and has a contact surface length of 9 cm with the slave tape, the second heater was kept near 80° C. The slave tape, which was heated at a front stage of the second heater, was wound on the take-up reel 26 while it travelled under a tension of 75 g/mm² at a velocity of 1 m/sec, with the base side of the slave tape in contact with the second heater. The deformation with the passage of time in the length of the slave tape thus prepared was measured. It showed a characteristic shown by a dash and dot line C in FIG. 1a. Experiment IV: Except that a side of the slave tape having a magnetic coating was in contact with the second heater, the same conditions as in Experiment III, that is, the same transfer condition, the same second heater temperature and the same slave tape tension were used to measure the deformation with the passage of time in the length of the slave tape. It showed a characteristic shown by the line D in FIG. 1a.

The above experiments proved that the deformation with the passage of time of the copy tape which had heretofore been a problem was considerably reduced by reheating the slave tape after having been thermal transferred, under a tension smaller than the slave tape tension during the thermal transfer. The present invention makes use of the above phenomenon to reduce the change in the skew distortion of the copy tape.

Figure 1A:
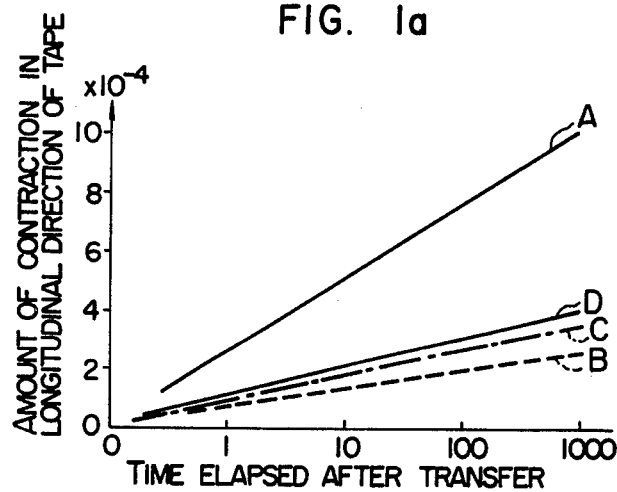
Figure 1B:
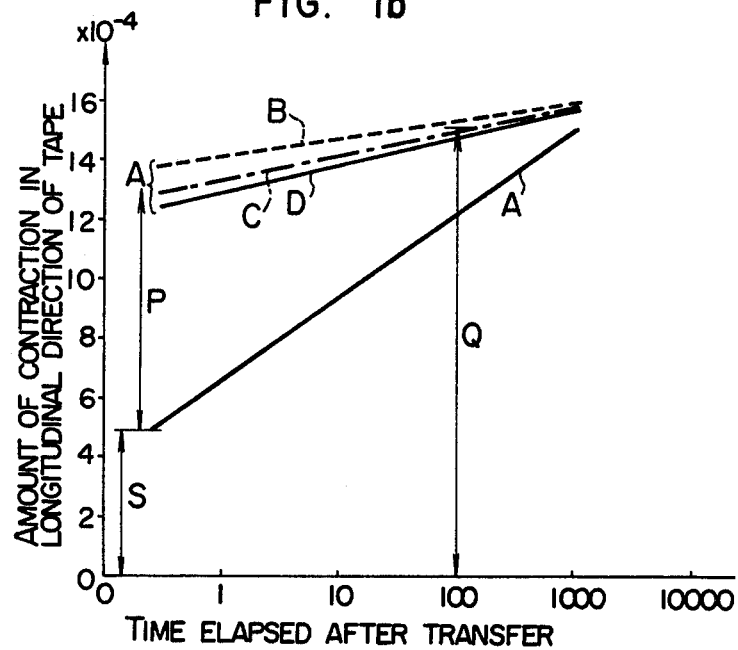
Figure 2:
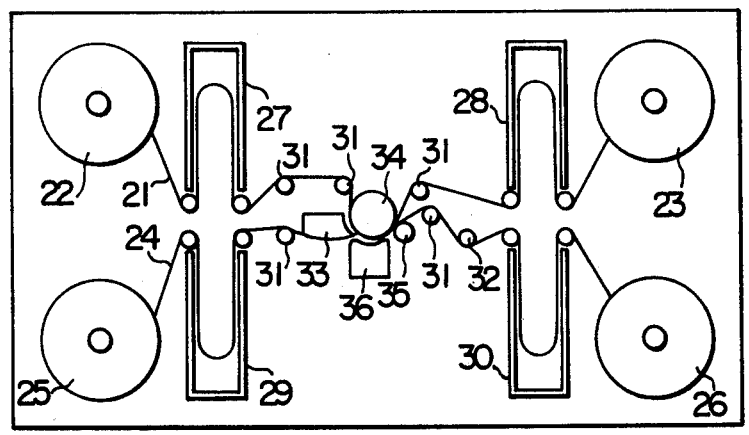

When the amount of change in time as well as the amount of contraction that occurs instantaneously after the heated transfer and the amount of contraction that occurs by reheating are taken into consideration, the amount of contraction of the slave tape after the thermal transfer as shown in FIG. 1a is represented as shown in FIG. 1b.

In FIG. 1b, the amount of contraction which occurs instantaneously after the thermal transfer is represented by S, and the amount of contraction which is produced by reheating in Experiments II, III and IV is represented by P. The reheating under a tension smaller than during the transfer process further reduces the stress that remains in the tape and hence is effective in reducing deformation with the passage of time of the tape. On the other hand, since the slave tape is contracted by the amount P by reheating, the transferred pattern on the slave tape contracts by an amount of approximately S + P after the reheating and by the amount Q after approximately 100 hours. Accordingly, it is preferred that the longitudinal component of the recorded pattern on the master tape used be recorded longer than the normal length taking the amount of contraction S + P or more of the slave tape into consideration. Where the master tape is prepared using a rotary head, the diameter of the rotary drum may be designed to be somewhat larger taking the above amount into consideration. In the reproduction of the slave tape having been transferred using the master tape thus prepared, the change of skew in time is much smaller than in the prior art methods and hence a practical method is provided. On the other hand, when no reheating is effected, the compensation in the longitudinal component of the master tape corresponds to the amount of instantaneous contraction S of the slave tape so that the reproduced image from the slave tape, even if it includes no skew distortion immediately after the transfer, shows the skew distortion which increases with time in correspondence with the amount of contraction of the tape given by the line A. This was a serious problem in practice, because the range of skew compensation attainable by a commonly used reproducing apparatus was not always enough to compensate for the skew distortion corresponding to the amount of contraction with age of the tape as defined by the line A. On the other hand, when the reheating is effected, the amount of contraction with age of the tape is considerably reduced in comparison with the case of the line A, as is apparent from the lines B, C and D so that it can fall within the range of compensation attainable by the skew compensation device of the commonly available reproducing apparatus.

Figure 3:
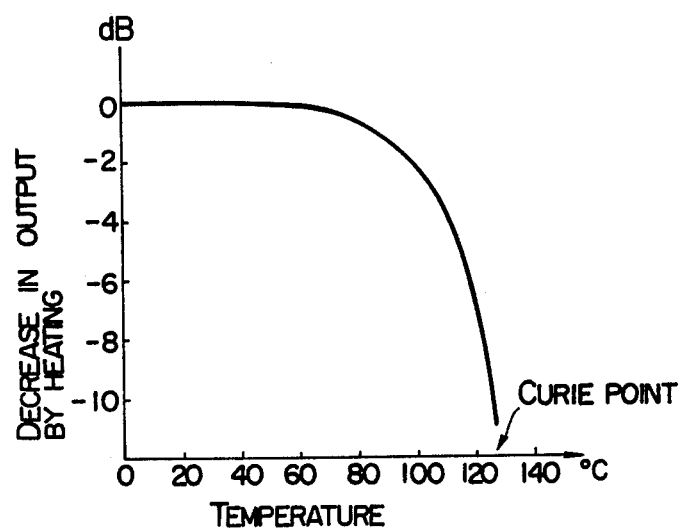

The effect of reheating the slave tape has been discussed above. What should be considered regarding the temperature of reheating is that when the slave tape having the signal transferred thereon is re-heated, the signal is demagnetized not only when the temperature of reheating is above the Curie point of the slave tape but also even below the Curie point provided that the temperature is sufficiently high. Accordingly, unless the temperature of reheating after the transfer is properly established, there is a risk of reduction of output by reheating of the slave tape in comparison with the case where no reheating is effected. The reduction of the transferred output by reheating was measured for a typical $CrO_2$ tape which showed the characteristic illustrated in FIG. 3. Since there is no practical problem if the reduction of the output is less than 1 dB, the reheating temperature may be set to a temperature below approximately 80° C. On the other hand, in order to suppress the change, in time, of the skew distortion, it is advantageous to conduct the reheating process at a high temperature because the reheating time period can be shortened. Accordingly, the reheating temperature should be determined from both standpoints of allowable value of the reduction of output of the slave tape and allowable value for the reheating time period. When a low reheating temperature is used, an effect similar to that attainable at a high reheating temperature can be obtained by prolonging the duration of reheating.

It has been found that the smaller the tension during reheating, the more effective it is to suppress the change of the skew distortion in time, and it has been proved that a significant effect was obtainable when the tension was less than 140 g per unit $mm^2$ of the tape sectional area.

Embodiments of the present invention, which have been taken the above points into consideration are explained below.

Figure 4:
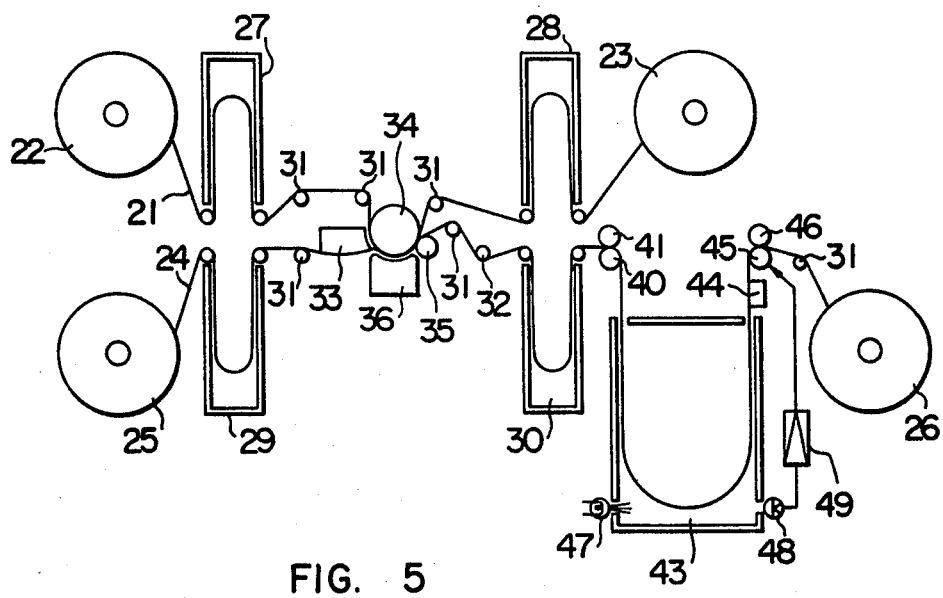

Embodiment 1: FIG. 4 shows an embodiment of the present invention in which there is provided a capstan 40 and a pinch roller 41 for controlling the tape tension between the slave tape take-up reel 26 and the take-up vacuum column 30 of the prior art apparatus shown in FIG. 2, for defining the position of the slave tape in the vacuum column 30. A constant temperature oven 43 is arranged behind the capstan 40. The tape emerging from the gap between the capstan 40 and the pinch roller 41 enters by its gravity force into the constant temperature oven 43, and the slave tape is then wound by a capstan 45 and a pinch roller 46 onto the take-up reel 26. 44 designates a tape sucker having small apertures on a contact surface thereof with the tape. Through small apertures which are connected to a vacuum pump (not shown) the length of the slave tape 24 which is wound as it comes out of the constant temperature oven 43 is sucked in by the tape sucker 44 so that an appropriate amount of frictional resistance is imparted to the length of the slave tape 24 which passes through the tape sucker. This stabilizes the introduction of the slave tape 24 into the capstan 45. The amount of slack of the slave tape 24 in the constant temperature oven 43 is controlled by detecting the amount of slack of the slave tape by a light source 47 and a light detector 48, the output of which is amplified by an amplifier 49 to control the rotational speed of the take-up capstan 45. In the embodiment shown in FIG. 4, the above requirement is met since the tension imparted to the slave tape 24 during reheating is only the gravity force of the tape. The temperature of the constant temperature oven is kept at approximately 80° C.

Because the embodiment shown in FIG. 4 includes the reheater comprising the constant temperature oven, it can conduct the transfer of the signal and the heat treatment of the copied tape in a continuous process, and the slave tape 24 wound on the take-up reel 26 can be immediately used as the copied tape.

Figure 5:
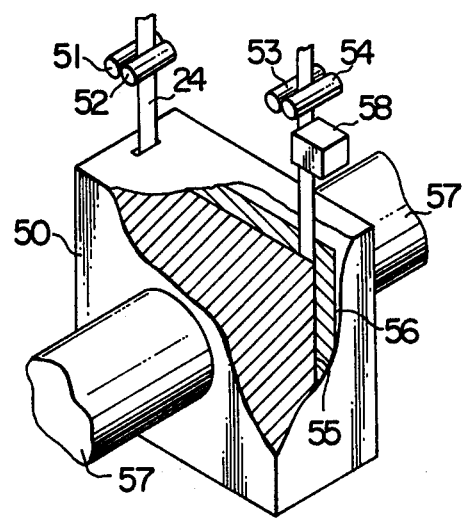

Several other embodiments of the reheating means are explained below:

Embodiment 2: Referring to FIG. 5 which shows a perspective view, partly broken away, of one embodiment, 24 designates the thermally copied slave tape, 50 the constant temperature oven, 51 and 52 a capstan and a pinch roller, respectively, for feeding the slave tape 24 into the constant temperature oven 50, and 53 and 54 a capstan and a pinch roller, respectively, for taking up the slave tape. Positioned at substantially the center within the constant temperature oven 50 are diaphragms 55 and 56 having ports such as small holes or slots formed therein to allow the passage of air therethrough, and the diaphragms 55 and 56 are so arranged to be spaced from each other by an amount somewhat wider than the tape width to allow the passage of the slave tape 24 between the diagrams 55 and 56. 57 denotes a duct through which a flow of hot air is circulated into the constant temperature oven 50. Air heated near 80° C is supplied to the constant temperature oven 50 to heat the slave tape 24 while the air is flowing between the diaphragms 55 and 56. 58 designates a tape sucker similar to the tape sucker 44 shown in FIG. 4 and it imparts an appropriate amount of frictional resistance to the slave tape 24 to stabilize the take-up of the slave tape by the take-up capstan 53 and the pinch roller 54.

In order to constantly store a constant length of the slave tape 24 within the constant temperature oven 50, a light source and a light detector element may be positioned near the bottom of the oven 50 to detect the position of the tape loop for controlling the rotating speed of the take-up capstan 53 in response to the detected output. Alternatively, the take-up capstan 53 may be stopped until a predetermined length of the slave tape 24 has been fed into the constant temperature oven 50, at which time the rotation of the take-up capstan 53 is started so that the amount of the take-up and the amount of the supply by the supply capstan 51 are balanced.

In the reheating method of the slave tape using the constant temperature oven of the above construction, since the slave tape 24 fed into the constant temperature oven 50 is defined in the widthwise direction thereof by the diaphragms 55 and 56 in the direction normal thereto, there is no risk of tape twist. Furthermore, since the heated air which passes through the constant temperature oven always flows uniformly in the widthwise direction of the tape, the slave tape 24 can be heated uniformly.

With the construction shown in FIG. 5, since the slave tape 24 enters into the constant temperature oven by its gravity force after it has passed the supply capstan 51 and the pinch roller 52, the slave tape 24 is slack in the oven 50. Thus, because the tape is heated while it is slack, the reheating can be performed satisfactorily.

While the embodiment shown in FIG. 5 employs a so-called vertial structure in which the insertion of the slave tape into the constant temperature oven is effected by the gravity force of the tape, a so-called horizontal structure in which the slave tape is fed to the constant temperature oven horizontally and taken out thereof horizontally may be used. In this case, the tape path defining diaphragms 55 and 56 should, of course, be arranged horizontally. The tape tension within the oven should be less than 140 g per unit mm² of the tape sectional area.

The reheating apparatus of the above construction may be used separately from the transfer apparatus or it may be constructed integrally with the transfer apparatus as shown in the embodiment of FIG. 4.

Embodiment 3: The present embodiment relates to a method in which the reheating process of the slave tape is effected by contacting the tape with a metal bulk heated to about 80° C. The embodiment will now be explained in conjunction with FIGS. 6, 7 and 11.

Figure 6:
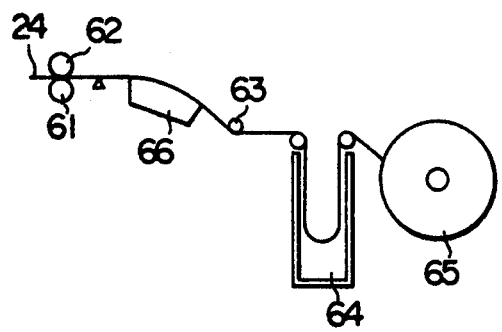
Figure 7:
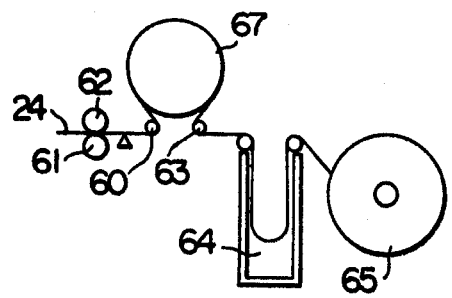

In FIGS. 6 and 7, 24 designates the copied slave tape with a mark Δ indicating the base side of the slave tape. 61 and 62 designate a capstan and a pinch roller, 60 and 63 travel guide posts, 64 a vacuum column for maintaining a constant tape tension and 65 a take-up reel, respectively.

In the embodiment shown in FIG. 6, the reheating is effected by a heat shoe 66 having a heater mounted therein. The embodiment of FIG. 6 is characterized by an extremely simple structure.

In the embodiment shown in FIG. 7, slave tape 24 taken out by the capstan 61 and the pinch roller 62 moves around an outer periphery of a circular reheater 67 and is reheated thereby. The embodiment of FIG. 7 is characterized by the fact that the heating length can be prolonged while occupying a small area because the reheater is of circular shape and that by making the circular heater 67 rotatable, the increase of the tension due to friction can be suppressed to compare with the case where a stationary reheater is used.

Figure 11:
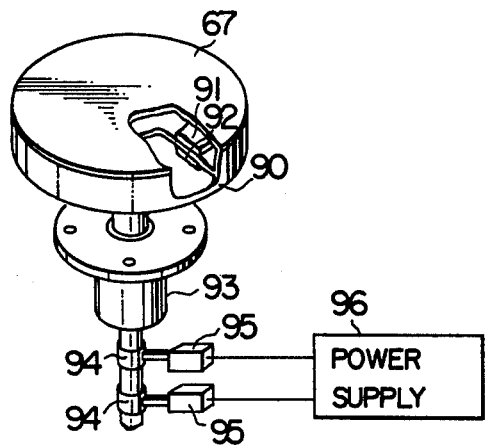
FIG. 11 shows an embodiment of a rotatable circular heater.

An example of the structure of the rotatable reheater is shown in FIG. 11 (partly broken away). In FIG. 11, 90 designates the outer periphery of the circular reheater, which heats the slave tape, not shown, that is in contact therewith. Disposed within the circular reheater are a pair of ring heaters 91 and 92, the heat from the heaters heating the outer periphery 90 of the circular reheater 67. 93 designates a bearing housing of a structure to allow the rotation of the circular reheater 67 with a small frictional resistance. Electric energy to the ring heaters 91 and 92 is supplied through a pair of sliding rings 94 and a pair of sliders 95 which are connected to a power supply 96. In either of the embodiments of FIGS. 6 and 7, the temperature of the reheater 66 or 67 should be maintained near 80° C and the tension of the slave tape during the reheating should be less than 140 g/mm².

Because the results of measurement of the deformation with the passage of time in Experiments III and IV show that a smaller amount of deformation with the passage of time occurs when the tape is heated from the base side thereof, it is desirable to effect the reheating of the slave tape from the base side marked with Δ, as shown in FIGS. 6 and 7. It has been proved that when the slave tapes resulting from Experiments III and IV were played back in a reproducing apparatus to measure the outputs of the reproduced signals, the slave tape resulting from Experiment IV showed a reproduced output which is 0.5 - 1 dB lower than that of the slave tape resulting from Experiment III. Thus, it is seen that when the copied slave tape is reheated from the magnetic coating side there occurs a problem that the transferred signal is partly erased. Although the erasure can be prevented by lowering the temperature during reheating, this would also decrease the effect of reducing the deformation with the passage of time. From the above standpoint, it is apparent that the reheating of the copied slave tape is desirably effected from the base side thereof rather than the magnetic coating side thereof.

Embodiment 4: The present embodiment relates to a method wherein, as shown in FIGS. 8 and 9, the reheating of the slave tape is effected by the combination of a heater comprising a metal bulk heated to about 80° C and a constant temperature oven maintained near 80° C therein.

Figure 8:
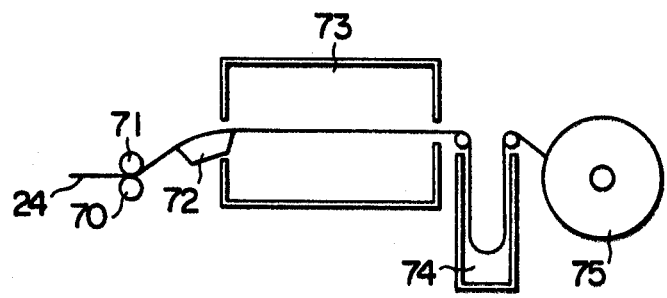
Figure 9:
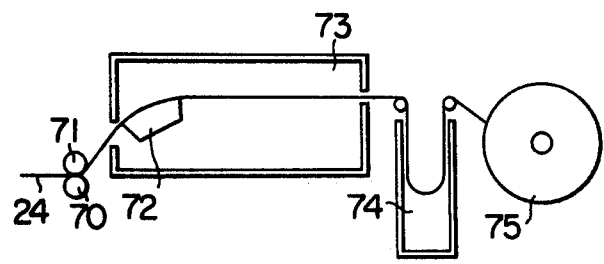

In FIGS. 8 and 9, 70 designates a capstan, 71 a pinch roller, 72 a front stage heater comprising a metal bulk for preheating the slave tape to about 80° C, 73 a constant temperature oven for maintaining the slave tape 24 heated by the front stage heater 72 near 80° C, 74 a vacuum column for maintaining stable and constant tension of the tape during the reheating, and 75 a take-up reel. The length of the contact area of the heater 72 with the slave tape 24 is designed to be the minimum that assures uniform heating of the base layer of the slave tape in the direction of the depth thereof. The heater 72 of FIG. 8 has its portion of tape send-out section positioned within the constant temperature oven to present the slave tape 24 after passing through the heater 72 from being-cooled. On the other hand, FIG. 9 shows an example in which the entire heater 72 is disposed within the constant temperature oven. The period of heating of the slave tape can be set to any desired time period by adjusting the travel path in the constant temperature oven 73. The front stage heating means is not limited to the sliding heating means such as the heater 72 illustrated in the present embodiment but it may be a radiation heat source such as a halogen lamp. According to the radiation heating method, there is provided the advantage of no addition of the tape tension due to sliding resistance. The temperature of the front stage heater 72 is not necessarily equal to the temperature of the constant temperature oven 73 provided that they are balanced with respect to each other. For example, the front stage heater 72 may heat the tape to a temperature somewhat lower than the reheating temperature and the tape may be subsequently heated to the required temperature in the constant temperature oven.

According to the present embodiment wherein the slave tape is initially heated uniformly by highly efficient sliding or radiation heating and then it is heated in a non-contact type constant temperature oven, it is not necessary to impose to the constant temperature oven the function of heating the slave tape to the reheating temperature but the oven need only function to maintain the slave tape at the reheating temperature. Therefore, the temperature drop in the constant temperature oven can be reduced and the internal volume of the constant temperature oven can be reduced. The smaller the tension applied to the slave tape during the reheating and the longer the period of the reheating, the more effective it is to reduce the deformation with the passage of time. Accordingly, the method of the present embodiment in which the apparatus is constructed to allow prolonged heating of the slave tape and the addition of the tension occurs only by the friction of the tape with the sliding heater and no addition of the tension occurs in the constant temperature oven in which the tape stays during the major part of the reheating period, sufficiently meets the above requirements of reducing the deformation with the passage of time.

Figure 10:
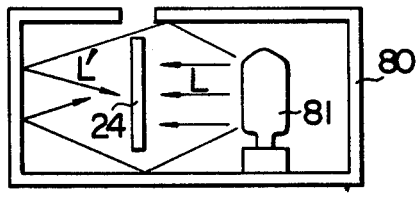
FIG. 10 shows an embodiment of the reheating means by thermal tranfer.

Embodiment 5: The present embodiment relates to a method in which heat radiation from a heat generating element such as a lamp is used to reheat the slave tape, as shown in FIG. 10, wherein 24 designates the slave tape, the tension of which is maintained at a minimum value, less than 140 g/mm². 80 denotes a shielding box which accommodates a portion of the travel path of the slave tape 24 and includes a heat generating element 81 such as a lamp therein. The slave tape 24 is heated by direct heat radiation L and reflected heat L' from the heat generating element 81. Since the present slave tape heating method is of the non-contact type, there is provided the advantages that no addition of the tension due to friction is included and the heat is applied to the tape mainly from one side thereof. Accordingly, by arranging the heat source on the side of the base side of the tape, the heat energy is primarily applied from the base side. This is advantageous in that the deformation with the passage of time can be reduced and the reduction of the reproduced output prevented, as explained above.

The reheating treatments for the slave tape in the present embodiment and in embodiments 3 and 4 may be effected integrally with the transfer section as is the case of embodiment 1 or they may be effected separately.

Several embodiments of the present invention have been illustrated. It should be noted that the tension applied to the slave tape during the reheating should be maintained until the slave tape is cooled near room temperature after it has been subjected to the reheating treatment. If a tension higher than the tension during the reheating is applied to the slave tape before the slave tape is cooled near room temperature, the effect of reducing the deformation with the passage of time by the present method is materially deteriorated. Therefore, it is desirable to provide means for cooling the slave tape near room temperature immediately downstream of the reheating section. In the embodiments shown in FIGS. 4 and 5, the cooling means may be provided between the constant temperature ovens 43, 50 and the tape suckers 44, 58. In the embodiments shown in FIGS. 6, 7, 8 and 9, the guide post 63 or the vacuum columns 64, 74 may be used as the cooling means. Where the guide post 63 is used as the cooling means, the guide post is preferably made of a material of high thermal conductivity.

What is claimed is:

1. A magnetic tape copying apparatus comprising
   supply means for retaining a recorded master tape and a non-recorded slave tape, each of said master and slave tapes having a magnetic coating surface and a base side,
   means for heating said slave tape to a temperature near the Curie point thereof,
   means for pressing the magnetic coating surfaces of said heated slave tape and said master tape together and for moving said tapes together in press contact with each other, said slave tape being under a first predetermined amount of tension,
   a heating oven,
   means for introducing said slave tape into said oven after being removed from press contact with said master tape, said slave tape being slack within said oven,
   means for controlling the tension of said slave tape within said oven at a second predetermined amount, said second predetermined amount of tension being finite and less than said first predetermined amount of tension, and
   takeup means for separately taking up said master and slave tapes.

2. A magnetic tape copying apparatus as defined by claim 1 which further comprises
   means for detecting the amount of slack in said slave tape within said heating oven, and
   means for controlling the amount of slack in said slave tape.

3. A magnetic tape copying apparatus as defined by claim 1 wherein said heating oven includes
   at least first and second diaphragms positioned within said oven adjacent the opposite sides of said slave tape, the widthwise direction of said tape extending between said diaphragms, and
   a duct for introducing heated air into said oven.

4. A magnetic tape copying apparatus as defined by claim 1 which further comprises
   preheating means interposed between said pressing means and said heating oven for preheating said slave tape to about 80° C.

5. A magnetic tape copying apparatus as defined by claim 1 wherein said slave tape is heated within said heating oven from the base side.

6. A magnetic tape copying apparatus as defined by claim 1 which further includes means for cooling said slave tape after it has passed through said heating oven.

* * * * *